United States Patent Office 3,075,844
Patented Jan. 29, 1963

3,075,844
NEWSINKS HAVING EXCELLENT RUB-OFF CHARACTERISTICS
Joseph P. Hall, Jr., Watertown, John F. Hardy, Andover, and Merrill E. Jordan, Walpole, Mass., assignors to Cabot Corporation, Boston, Mass., a corporation of Delaware
No Drawing. Filed May 5, 1960, Ser. No. 26,935
6 Claims. (Cl. 106—27)

This invention relates to inks and in particular to newsinks containing large quantities of oil furnace carbon black.

Channel carbon blacks have historically been utilized as the pigment in newsink formulations. With the advent of furnace carbon blacks, it was hoped that furnace blacks would replace the more costly channel carbon blacks in newsinks. Unfortunately, however, the use of furnace carbon blacks in a conventional newsink formulation produces a newsink having objectionable rub-off characteristics. Moreover, the rub-off characteristics of such inks become increasingly objectionable with increasing furnace carbon black loading. Accordingly, furnace carbon blacks have heretofore been utilized in newsinks only in moderate quantities, and with reluctance. The newsinks of the present invention, however, although they contain large quantities of furnace carbon black, nevertheless are not subject to excessive rub-off.

Accordingly, it is a principal object of the present invention to provide improved newsinks.

It is another object of this invention to provide newsinks containing oil furnace carbon black which have excellent rub-off characteristics.

Other objects will in part be obvious and will in part appear hereinafter.

In accordance with the present invention, it was discovered that the rub-off characterictics of a newsink containing oil furnace carbon black are surprisingly improved when at least about 5% by weight of the contained oil furnace carbon black, of a potassium salt such as potassium stearate, potassium succinate, potassium oxalate or potassium chloride is added to the newsink. The reason for the unexpected improvement is not completely understood, but it is believed, and there is no intention to be bound by this explanation, that said potassium salts decrease the surface tension of the oil furnace carbon black particles and thereby allow said particles to slip into the interstices of, and become bound to, the substrate, thereby decreasing the tendency of said particles to rub off.

It has been found that the rub-off characteristics of newsinks comprising any type of mineral oil vehicle and furnace carbon black can be improved by the addition thereto of the aforementioned potassium salts. Accordingly, any type of mineral oil can be utilized as the vehicle in the newsinks of the present invention. For example, low and high viscosity mineral oils are both generally suitable for the purposes of the present invention.

The maximum quantity of the potassium salts that can be utilized is not critical but quantities of greater than about 25% by weight of the furnace carbon black pigment will seldom be utilized because little or no improvement in rub-off characteristics is achieved at higher loadings and because the use of quantities greater than about 25% becomes increasingly economically disadvantageous.

In addition to a vehicle, oil furnace carbon black, and a potassium salt, the newsinks of the present invention may contain any of the other ingredients normally utilized in newsinks such as channel carbon black, gas furnace carbon black, and flow improving agents, such as gilsonite.

The particle size of the oil furnace carbon black utilized is not critical although furnace blacks having a particle size of less than about 100 millimicrons are generally preferred.

Likewise the oil furnace carbon black content of the inks of the present invention is not critical. Newsinks generally contain between about 8 and 16 parts, by weight of the ink vehicle, of carbon black, which may be all oil furnace carbon black, all channel carbon black, partially gas furnace carbon black or a combination thereof. The present invention, however, is primarily directed to newsinks containing at least about 2 parts and preferably about 4 parts, by weight of the vehicle of oil furnace carbon blacks.

There follow a number of non-limiting illustrative examples:

*Examples 1–12*

There was made up an ink composition consisting of 450 grams of "F–87," a low viscosity mineral oil containing about 2% gilsonite produced by Sun Chemical Co., and 50 grams of "Elftex-8," an oil furnace carbon black produced by Cabot Carbon Co., and having a particle size of about 29 millimicrons. This composition was divided into twelve equal portions into each of eleven of which was introudced an additive as indicated in the table below. Subsequently, each portion was heated to 180° F. and the mixture stirred for 3 minutes at maximum speed in an Eppenbach mixer. On cooling, 8 drawdowns of each portion were made with a 0.0015 inch drawdown blade on newsprint paper. After drying, each drawdown was given a code number, and a finger tip smear test was made and transferred onto Scotch tape which was then mounted on microslides for visual observation by a panel of four experts skilled in the art of evaluating the rub-off of newsinks. The results follow. A value of 50% indicates no visual difference between the control and the sample. A value of less than 50% indicates that visually the smear test appeared darker than the control and that therefore rub-off of that sample was greater than that of the control. A value of more than 50% indicates that the smear test appeared lighter than the control and that therefore rub-off of that sample was less than that of the control.

The results were as follows:

| Additive | Quantity of Additive (in percent by weight of furnace black contained) | Result, percent |
|---|---|---|
| 1. Control | | 50 |
| 2. Potassium oleate | 5 | 60 |
| 3. Potassium oleate | 10 | 66 |
| 4. Potassium oleate | 20 | 62 |
| 5. Sodium oleate | 5 | 46 |
| 6. Copper oleate | 5 | 50 |
| 7. Ammonium oleate | 5 | 50 |
| 8. Potassium citrate | 5 | 64 |
| 9. Potassium acetate | 5 | 66 |
| 10. Sodium acetate | 5 | 41 |
| 11. Cesium chloride | 5 | 46 |
| 12. Potassium chloride | 5 | 72 |

It can be seen from the above data that in every case the potassium salts substantially decreased rub-off whereas copper oleate and ammonium oleate had no effect and surprisingly sodium acetate, sodium oleate and cesium chloride increased rub-off.

Obviously many changes may be made in the above description and examples without departing from the scope of the invention. For example, mixtures of individually suitable potassium salts are also suitable for use in the present invention.

What we claim is:
1. A newsink having excellent rub-off characteristics which comprises mineral oil, oil furnace carbon black, and between about 5 and about 25% by weight of said furnace carbon black of a potassium salt.

2. The newsink of claim 1 wherein said oil furnace carbon black comprises at least about 25% by weight of the total quantity of carbon black contained in said newsink.

3. The newsink of claim 1 wherein said potassium salt is chosen from the group consisting of potassium oleate, potassium stearate, potassium acetate, potassium citrate and potassium chloride.

4. The newsink of claim 3 wherein said potassium salt is potassium oleate.

5. The newsink of claim 3 wherein said potassium salt is potassium chloride.

6. The newsink of claim 1 wherein said oil furnace carbon black comprises at least about 50% by weight of the total quantity of carbon black contained in said newsink.

References Cited in the file of this patent
UNITED STATES PATENTS

| | | |
|---|---|---|
| 1,524,872 | McLeod et al. | Feb. 3, 1925 |
| 3,010,794 | Friauf et al. | Nov. 28, 1961 |

OTHER REFERENCES

Ellis: "Printing Inks," 1940, published in N.Y.C. by Reinhold, pages 116, 211 and 480.

Voet et al.: Amer. Ink Maker, March 1960, "Rub Off of Printed News Stock" (page 36 et seq.).